United States Patent Office 3,563,075
Patented Feb. 16, 1971

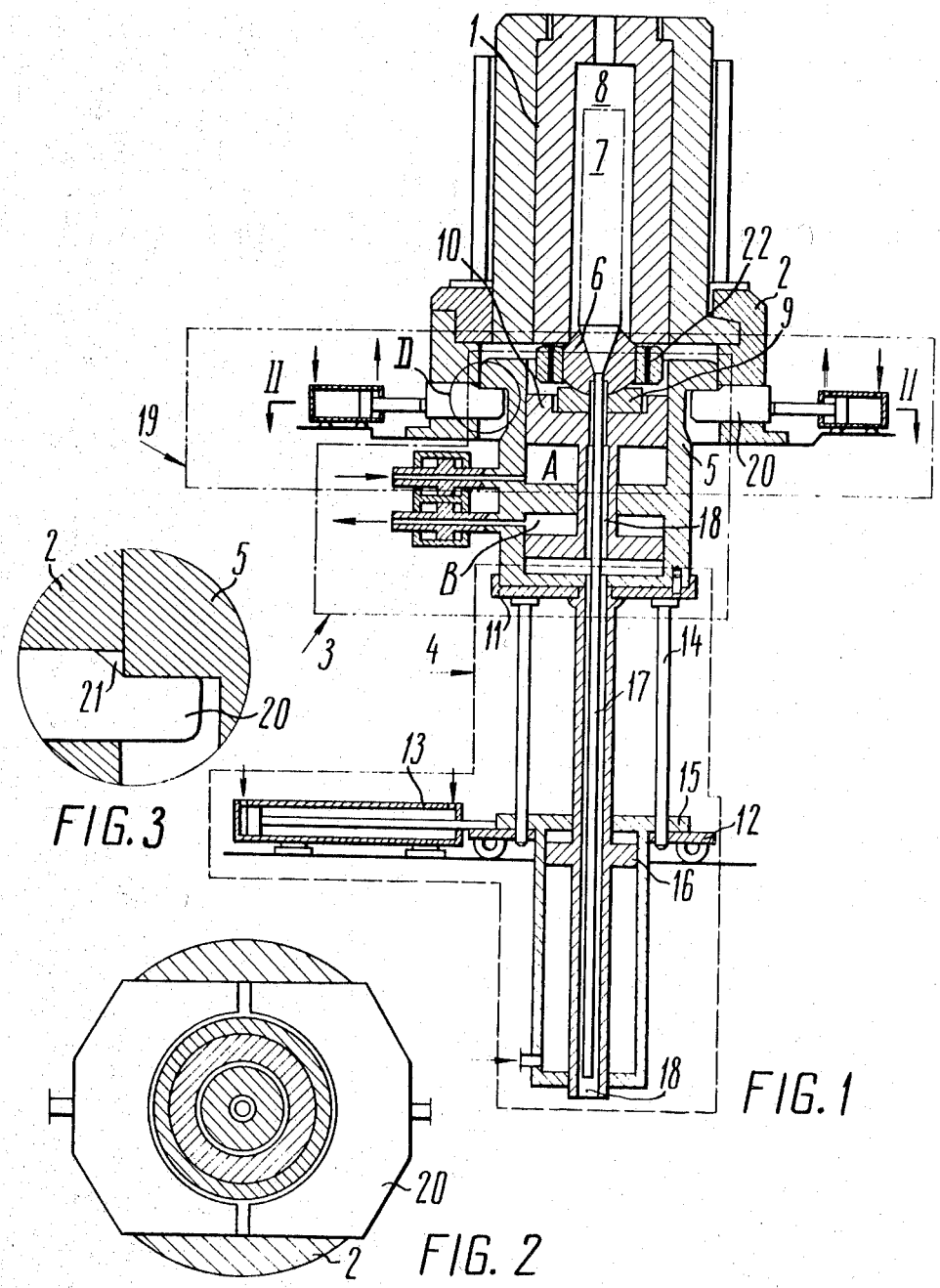

3,563,075
INSTALLATION FOR HYDROSTATIC EXTRUSION OF RODS AND TUBULAR AND PROFILED ARTICLES
Boris Ivanovich Beresnev, Evgeny Dmitrievich Martynov, Mikhail Vasilievich Maltsev, Georgy Pavlovich Britnev, Anatoly Vasilievich Kocherov, Konstantin Ivanovich Ezersky, and Vladimir Ivanovich Monakhov, Moscow, U.S.S.R., assignors to Institut Fiziki Metallov, Sverdlovsk, U.S.S.R.
Filed Jan. 5, 1968, Ser. No. 695,917
Int. Cl. B21c 23/04
U.S. Cl. 72—60
10 Claims

ABSTRACT OF THE DISCLOSURE

Extrusion apparatus comprises a frame carrying a container having a chamber in which a blank can be inserted and hydrostatic fluid pressure can be developed to extrude the blank through a die which is positionable against the container. The die is pressed against the container by a hydraulic drive which is displaceable both longitudinally and transversely of the chamber. In the course of extrusion, a locking device couples the hydraulic drive and the container via the frame. The piston of the hydraulic drive has a bore through which the extruded article may pass during the extrusion operation.

---

This invention relates to apparatus for pressure working of metal articles and, more particularly, to installations for hydrostatic extrusion of rods and tubular and profiled articles made of metal.

The known installations for hydrostatic extrusion of rods and tubular and profiled articles are provided with containers wherein hydrostatic fluid pressure is built up for extruding a blank through a die pressed against the container by means of a hydraulic drive coupled with said container.

In the known installations, the joint between the hydraulic drive and the container (of thread or bayonet type) does not insure rapid and reliable connection or disconnection of the aforementioned units. This results in frequent stoppages and lower efficiency of the installation.

The use of manual labor in the known installations for performing auxiliary operations such as loading the container with blanks and fastening the hydraulic drive to the container, prolongs the working cycle, creates inconveniences in the maintenance of the installation and creates difficulties in the use of powerful installations for the manufacture of large articles.

An object of the present invention is to provide an installation for hydrostatic extrusion of rods, tubular and profiled articles, which installation is adapted for hydrostatic extrusion of the above-mentioned articles from heavy and long blanks made of strain-resistant metals.

It is another object of the invention to provide an installation which will insure convenient maintenance, eliminate manual labor in auxiliary operations and increase the labor efficiency.

In accordance with the aforementioned and other objects, the installation of the present invention for hydro static extrusion of rods and tubular and profiled articles is provided with a container in which hydrostatic fluid pressure is built up for extruding a blank through a die pressed against the container by means of a hydraulic drive coupled with said container. In accordance with the invention, said hydraulic drive of the installation is provided with a device for shifting the hydraulic power cylinder together with the die along and normal to the axis of the installation, the hydraulic drive being connected to the container by means of a locking device and a frame carrying the container.

The device for shifting the hydraulic power cylinder together with the die along the axis of the installation and normal thereto is essentially a carriage provided with a drive and a mechanism insuring vertical movement of the hydraulic power cylinder together with the die, said mechanism being mounted on said carriage.

For shifting the die, it is expedient to mount it on the piston of the hydraulic power cylinder providing for self-adjustment of said die. To insure said self-adjustment of the die during its pressing against the container it is provided with a support which mates with the die along a spherical surface and with the cylinder along a flat surface.

The fixing device which connects the hydraulic drive to the container can be made in the form of releasable locking gibs entering holes of the frame and gripping the body of the hydraulic power cylinder.

Thus, the proposed installation allows the performance of hydrostatic extrusion of heavy and long blanks made of strain-resistant metals and alloys, it considerably increases the labor efficiency due to the reduction of time spent on auxiliary operations, it eliminates manual labor and it provides for convenient maintenance.

Other objects and advantages of the present invention will become apparent upon considering an embodiment thereof with reference to the accompanying drawings, wherein:

FIG. 1 is a diagrammatic elevation view, in section, of the installation according to the invention;

FIG. 2 is a section, taken on line II—II of FIG. 1; and

FIG. 3 shows detail D of FIG. 1, on enlarged scale.

The installation according to the present invention for the hydrostatic extrusion of rods, and tubular and profiled articles consists of three units namely a stationary unit consisting of a container 1 and a frame 2 (FIGS. 1 and 2), a movable unit comprising a hydraulic drive 3 and a device 4 for shifting a hydraulic power cylinder 5 of said hydraulic drive together with a die 6 along the axis of the installation or normal to it. A fixing device connects container 1 to hydraulic drive 3 during the extrusion of a blank 7 through die 6.

Frame 2 installed on a base carries container 1.

Die 6 rests on a support 9 which is mounted on a piston 10 of hydraulic power cylinder 5, and the die adjoins the lower portion of a passage 8 within container 1. To insure self-adjustment of die 6 while it is pressed against container 1, support 9 mates with die 6 along a spherical surface and with piston 10 along a flat surface.

The lower portion of passage 8 in container 1, to which die 6 is adjoined, has a tapered surface coinciding with that of the upper portion of die 6 to insure reliable sealing of container 1 when hydrostatic pressure is built up therein.

Hydraulic power cylinder 5 is installed on a platform 11 of device 4 which shifts the cylinders together with die 6 along the axis of the installation or normal to it. Device 4 comprises two mechanisms, namely, a mechanism for moving hydraulic power cylinder 5 together with die 6 in the direction normal to the axis of the installation, which consists of a carriage 12 with a drive 13, and a mechanism providing for the vertical movement thereof, which consists of platform 11, guides 14 and a hydraulic cylinder 15.

Guides 14 and hydraulic cylinder 15 are mounted on carriage 12 as shown in FIG. 1.

With an upward or downward motion of piston 16 within hydraulic cylinder 15 the piston rod, connected to platform 11, raises or lowers it respectively, guides 14 being moved within passages of carriage 12.

There are passages 18 in the rods of pistons 10 and 16 for articles 17 leaving die 6.

Hydraulic power cylinder 5 has two chambers A and B which provide for the double-action of piston 10, that is, when the pressure is built up in chamber A piston 10 forces die 6 against container 1, while when the pressure is built up in chamber B piston 10 moves downwards allowing die 6 to be withdrawn from container 1.

Container 1 is connected to hydraulic drive 3 by means of a locking device 19 via frame 2.

Locking device 19 consists of releasable locking gibs 20 (FIGS. 2 and 3) which enter holes 21 of frame 2 and grip the body of hydraulic power cylinder 5.

Induction heaters 22 (FIG. 1) are mounted in die 6 and container 1 to heat blank 7 during the process of extrusion.

The installation of the present invention for extruding rods, and tubular and profiled articles operates as follows.

At the beginning of the working cycle, device 4 for shifting hydraulic power cylinder 5 and die 6 is in a loading zone laterally displaced from container 1. This is also an unloading zone for an extruded article as will be seen later.

Die 6, with blank 7 preliminary press-fitted therein is placed on support 9 mounted on piston 10 of hydraulic power cylinder 5. Drive 13 is engaged and carriage 12 is brought under container 1, the carriage 12 carrying the mechanism for the vertical movement, hydraulic power cylinder 5 with die 6 and blank 7 installed thereon.

Carriage 12 is stopped at a predetermined position, drive 13 is de-actuated and the mechanism of the vertical movement raises hydraulic power cylinder 5 and die 6 into the extreme upper position. As a result blank 7 enters the passage 8 of container 1 while die 6 assumes the position adjoining the lower portion of said container. The locking gibs 20 are moved in passages 21 (FIG. 3) of frame 2 to grip the body of hydraulic power cylinder 5 (FIG. 1) and rigidly connect container 1 to hydraulic drive 3.

Pressure is built up in chamber A to move piston 10 upwards, which, in turn, forces die 6 against container 1 for sealing the latter.

Fluid is supplied under high pressure into passage 8 of container 1 to effect extrusion of blank 7 through die 6 into passage 18, a certain press-residue being left to preclude the "blurting out" of the article.

The withdrawal of die 6 from container 1 during the extrusion of blank 7 is prevented by exerting pressure on piston 10 of hydraulic cylinder 5, which pressure is somewhat higher than the hydrostatic fluid pressure in container 1.

After blank 7 has been extruded, piston 10 is moved downwards, die 6 is removed from container 1, locking gibs 20 are released and hydraulic power cylinder 5 together with die 6 and article 17 is moved down by device 4 and is shifted laterally from container 1 into the unloading zone.

Article 17 is separated from the press-residue, and die 6 containing said press-residue is taken to a special press for removal of the residue, whereas a new die with a blank press-fitted therein is mounted on the piston of hydraulic power cylinder 5 and the working cycle is repeated.

In describing the preferred embodiment of the present invention illustrated in the drawings, specific terminology has been used for the sake of clarity. However, it is not intended to be limited to the specific terms so selected and it is to be understood that each specific term includes all technical equivalents which operate in a similar manner to accomplish a similar purpose.

Although the present invention has been described in accordance with a preferred embodiment thereof, it will be understood that various changes and modifications may be made without departing from the spirit and scope of the invention, as those skilled in the art will readily understand.

Such changes and modifications are to be considered as falling within the essence and scope of the invention as set forth in the appended claims.

What is claimed is:

1. Apparatus for the hydrostatic extrusion of a blank into rods, tubular articles or profiled articles, said apparatus comprising: a frame; a container carried by said frame and having a chamber in which a blank can be inserted and hydrostatic fluid pressure can be developed; a die positionable adjacent the container for extruding the blank under the pressure of the fluid in said chamber; hydraulic drive means for pressing said die against said container; said hydraulic drive means including a power cylinder and a piston in said cylinder supporting said die and having a bore for passage therethrough of the extruded article; means for shifting said piston with said die relative to said chamber both longitudinally and transverse thereto; and locking means for coupling said hydraulic drive means and said container via said frame whereby said blank can be extruded with the die held firmly against said container.

2. Apparatus as claimed in claim 1, wherein said means for shifting the piston together with the die comprises a carriage with a horizontal drive means and with means for the vertical movement of the hydraulic power cylinder together with the die mounted on said piston.

3. Apparatus as claimed in claim 1 comprising means mounting the die on the piston of the power cylinder for self-adjustment.

4. Apparatus as claimed in claim 2 comprising means mounting the die on the piston of the power cylinder for self-adjustment.

5. Apparatus as claimed in claim 3, wherein the means for self-adjustment of the die comprises a support with a spherical surface for receiving the die to provide for its self-adjustment, said support having a flat surface mating with the piston in the power cylinder.

6. Apparatus as claimed in claim 4, wherein the means for self-adjustment of the die comprises a support with a spherical surface for receiving the die to provide for its self-adjustment, said support having a flat surface mating with the piston in the power cylinder.

7. Apparatus as claimed in claim 1, wherein said locking means comprises releasable locking gibs entering holes provided in the frame for gripping the hydraulic power cylinder.

8. Apparatus as claimed in claim 2, wherein said locking means comprises releasable locking gibs entering holes provided in the frame for gripping the hydraulic power cylinder.

9. Apparatus as claimed in claim 3, wherein said locking means comprises releasable locking gibs entering holes provided in the frame for gripping the hydraulic power cylinder.

10. Apparatus as claimed in claim 4, wherein said locking means comprises releasable locking gibs entering holes provided in the frame for gripping the hydraulic power cylinder.

References Cited

UNITED STATES PATENTS

| 927,076 | 7/1909 | Remmen | 72—263 |
|---|---|---|---|
| 3,328,998 | 7/1967 | Sabroff et al. | 72—60 |
| 3,364,719 | 1/1968 | Asari | 72—263 |

RICHARD J. HERBST, Primary Examiner

U.S. Cl. X.R.

72—263, 710